US009586268B2

(12) United States Patent
McCluskey et al.

(10) Patent No.: US 9,586,268 B2
(45) Date of Patent: Mar. 7, 2017

(54) COLLET ADAPTOR

(71) Applicant: ANCA Pty Ltd, Bayswater North (AU)

(72) Inventors: Pat McCluskey, Bayswater North (AU); Sateesh Savanur, Bayswater North (AU)

(73) Assignee: Anca Pty Ltd, Victoria (AU)

( * ) Notice: Subject to any disclaimer, the term of this patent is extended or adjusted under 35 U.S.C. 154(b) by 53 days.

(21) Appl. No.: 14/379,517

(22) PCT Filed: Feb. 20, 2013

(86) PCT No.: PCT/AU2013/000154
§ 371 (c)(1),
(2) Date: Aug. 19, 2014

(87) PCT Pub. No.: WO2013/123556
PCT Pub. Date: Aug. 29, 2013

(65) Prior Publication Data
US 2015/0014947 A1   Jan. 15, 2015

(30) Foreign Application Priority Data

Feb. 20, 2012   (AU) ................................ 2012900616

(51) Int. Cl.
*B23B 31/20* (2006.01)
*B23B 31/10* (2006.01)
*B23B 31/26* (2006.01)

(52) U.S. Cl.
CPC ............ *B23B 31/20* (2013.01); *B23B 31/102* (2013.01); *B23B 31/207* (2013.01); *B23B 31/205* (2013.01);
(Continued)

(58) Field of Classification Search
CPC ... B23B 31/204; B23B 31/205; B23B 31/207; B23B 31/265; B23B 2231/2005;
(Continued)

(56) References Cited

U.S. PATENT DOCUMENTS 2,389,633 A * 11/1945 Odom .................. B23B 31/207
279/153
2,608,414 A *  8/1952 Montgomery ........ B23B 31/001
279/51

(Continued)

FOREIGN PATENT DOCUMENTS

CH            355 671 A      7/1961
CN         102209600 A     10/2011
(Continued)

OTHER PUBLICATIONS

JP H-06-218607 A (Okuma Machinery Works Ltd) Aug. 9, 1994 (abstract) Worldwide Epsacenet [online] [retrieved on Aug. 14, 2014] Retrieved from Internet: <URL: http://worldwide.espacenet.com/publicationDetails/biblio?DB=worldwide.espacenet.com&II=0&ND=3&adj.
(Continued)

*Primary Examiner* — Eric A Gates
*Assistant Examiner* — Chwen-Wei Su
(74) *Attorney, Agent, or Firm* — Woodard, Emhardt, Moriarty, McNett & Henry LLP

(57) ABSTRACT

A collet adaptor (10) including a body (11, 12) having forward and rear ends and an axial bore (17) extending through the forward and rear ends. A drawbar (13) disposed at least partly within the bore (17) for connection to a collet (14). The drawbar (13) is secured within the bore (17) and a biasing arrangement (42) acts on the drawbar (13) in a direction tending to shift the drawbar (13) rearwardly within the bore (17). The drawbar (13) is displaceable within the
(Continued)

bore (17) against the biasing influence of the biasing arrangement (42) to shift forwardly within the bore (17).

19 Claims, 2 Drawing Sheets

(52) U.S. Cl.
CPC ......... *B23B 31/265* (2013.01); *B23B 2231/04* (2013.01); *B23B 2231/20* (2013.01); *B23B 2231/2005* (2013.01); *B23B 2231/2083* (2013.01); *B23B 2260/034* (2013.01); *B23B 2260/136* (2013.01); *B23B 2260/142* (2013.01); *Y10T 279/17358* (2015.01); *Y10T 279/3406* (2015.01); *Y10T 409/309408* (2015.01); *Y10T 409/309464* (2015.01)

(58) Field of Classification Search
CPC ....... B23B 2260/034; B23B 2231/2083; Y10T 279/17324; Y10T 279/17427; Y10T 279/17471; Y10T 279/17341; Y10T 279/17376; Y10T 279/17529; Y10T 409/309408; Y10T 409/309464
See application file for complete search history.

(56) References Cited

U.S. PATENT DOCUMENTS

| | | | | |
|---|---|---|---|---|
| 3,094,102 | A | | 6/1963 | Schwarzaugl |
| 3,599,998 | A | * | 8/1971 | Kiwalle ................ B23B 31/204 228/2.3 |
| 3,625,530 | A | * | 12/1971 | Parsons ................ B23B 31/205 279/4.08 |
| 3,643,969 | A | | 2/1972 | Finley et al. |
| 3,678,790 | A | * | 7/1972 | Riley .................... B23B 31/208 279/2.12 |
| 3,724,563 | A | * | 4/1973 | Wickham .............. B23B 31/207 173/221 |
| 4,266,895 | A | * | 5/1981 | Lewis ................ B23B 31/1074 279/52 |
| 4,396,320 | A | | 8/1983 | Bellmann et al. |
| 4,762,447 | A | * | 8/1988 | Marantette ........... B23B 31/205 279/4.04 |
| 4,791,841 | A | * | 12/1988 | Pruvot ................. B23B 31/205 279/4.08 |
| 5,156,043 | A | * | 10/1992 | Ose ...................... B23B 31/204 279/4.08 |
| 5,279,194 | A | * | 1/1994 | Armbrust .............. B23B 29/046 279/75 |
| 5,806,859 | A | | 9/1998 | Saccomanno, III |
| 2006/0290077 | A1 | | 12/2006 | Tanga |
| 2007/0057473 | A1 | * | 3/2007 | Pavey ................... B23B 31/202 279/131 |

FOREIGN PATENT DOCUMENTS

| | | |
|---|---|---|
| CN | 202028931 U | 11/2011 |
| EP | 0 213 075 A1 | 3/1987 |
| EP | 2 014 396 A1 | 1/2009 |
| FR | 2 042 090 A5 | 2/1971 |
| GB | 1456611 A | 11/1976 |
| JP | 64-064707 | 3/1989 |
| JP | H06-218607 A | 9/1994 |
| JP | 2002-046005 | 2/2002 |
| JP | 2004249440 A | 9/2004 |
| WO | WO 2004/007128 A1 | 1/2004 |
| WO | WO 2004/103619 A2 | 12/2004 |

OTHER PUBLICATIONS

International Preliminary Report on Patentability from related PCT/AU2013/000154 mailed Sep. 6, 2013 by Australian Patent Office.
Machine Translation of EP213075A1 by Lexis Nexis Total Patent on Aug. 28, 2015.
Machine Translation of FR2042090A5 by Lexis Nexis Total Patent on Aug. 28, 2015.
Machine Translation of EP2014396A1 by Lexis Nexis Total Patent on Aug. 28, 2015.
Machine Translation of CN102209600A by Lexis Nexis Total Patent on Jan. 28, 2016.
Machine Translation of CN202028931U by Lexis Nexis Total Patent on Jan. 28, 2016.
Machine Translation of JP2004249440A by Lexis Nexis Total Patent on Jan. 28, 2016.
Machine Translation of CH355671 provided by foreign associate on Oct. 7, 2015.
Machine Translation of JP2002-046005 by Patent Abstracts of Japan received from foreign associate on Nov. 22, 2016.
Machine Translation of JP64-064707 by Patent Abstracts of Japan received from foreign associate on Nov. 22, 2016.

* cited by examiner

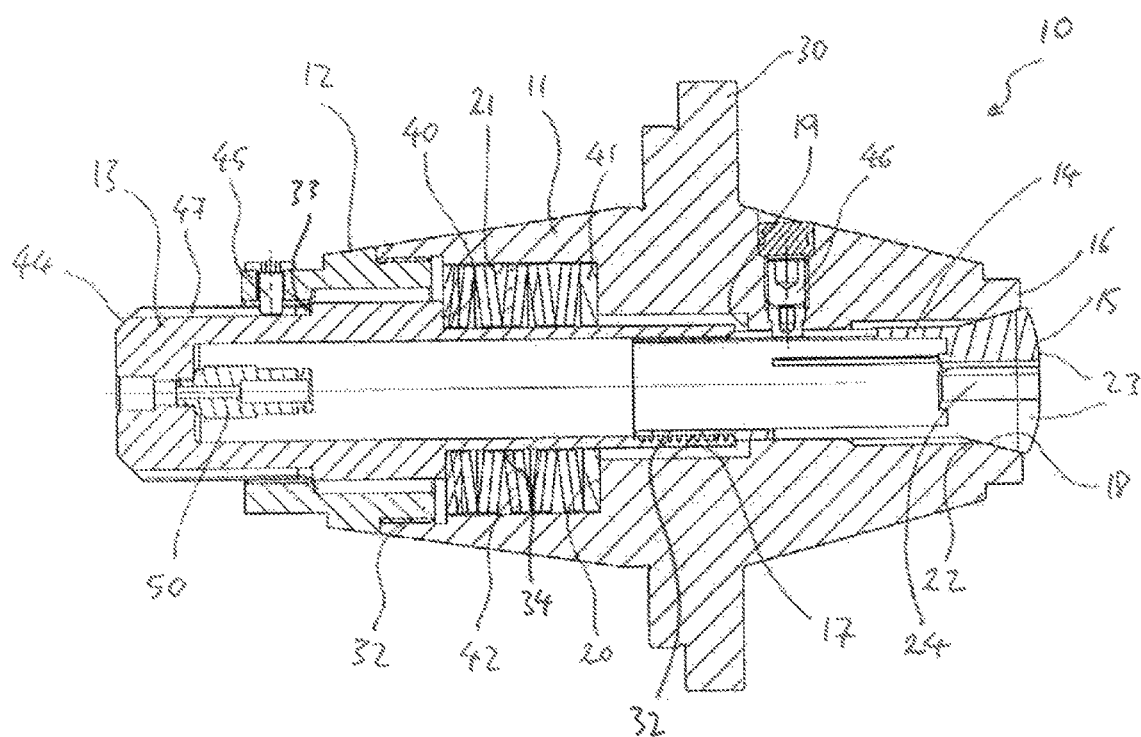

COLLET ADAPTOR

REFERENCE TO RELATED APPLICATIONS

This application is the U.S. national stage application of International Patent Application No. PCT/AU2013/000154, filed Feb. 20, 2013, which claims priority of Australia Application No. 2012900616, filed Feb. 20, 2012, the disclosures of each of which are incorporated herein by reference in their entirety.

FIELD OF THE INVENTION

The present invention relates to a collet adaptor which has been developed principally for use in tool forming machinery, such as computer numerically controlled (CNC) machinery or other grinding or milling machinery. The collet adaptor of the present invention has been developed particularly for use in high precision CNC machinery, although it is to be appreciated that it is not intended to be restricted to use in that type of machinery only.

BACKGROUND OF THE INVENTION

A collet adaptor is a component of a machine in which a collet is used to clamp a tool or a tool blank for machining. The collet is a clamping device which includes loading and clamping conditions, whereby a tool or tool blank is loaded by insertion into the collet and is thereafter clamped. In the clamping condition, the collet grips the tool or tool blank and with the collet secured within the collet adaptor, the tool or tool blank can be machined, such as by grinding or milling. Collet adaptors secure the collets that clamp the tool.

Collets normally engage a tool or tool blank by gripping a portion of the tool or tool blank, usually one end of the tool or tool blank. In a common form of collet, the gripping section is formed in separated segments, that define a central bore, and that splay outwardly to allow insertion of one end of the tool or tool blank into the bore and which can be closed about the tool or tool blank to grip the tool or tool blank. In many forms of collet adaptor, at least the segmented part of the collet is formed to have a tapered outside surface and the collet adaptor has a complementary tapered bore, so that as the collet is shifted inwardly relative to the collet adaptor, the outside surface of the collet segments slide along the tapered inside surface of the collet adaptor and the segments are slowly pushed radially inwardly to grip the tool or tool blank.

To release the tool or tool blank from the collet, the collet can be shifted forwardly, so that the collet segments splay outwardly and release the gripping load on the tool or tool blank. The tool or tool blank can then be removed from the collet and a new tool or tool blank can be inserted and the process repeated for gripping purposes. All of this process can be automated.

It is important that the mechanism of gripping and release of a tool or tool blank is a simple and quick process. It is also important that the changeover of collets be simple and quick. Combined with these requirements, it is important that the collet adaptor maintain precision grip of a collet and a tool or tool blank.

Collet adaptors with interchangeability capability secure collets in a manner so that different collet sizes can be secured in the same collet adaptor. This differs from collet adaptors which do not have that capability and which are able to secure collets of one size only. Collet adaptors with interchangeability capability typically engage with an elongate drawbar which is external to the collet adaptor and which is part of a tool forming machine (CNC grinding or milling for example). The elongate drawbar connects to one end of a collet adaptor drawbar which itself is connected to the collet. The tool forming machinery often includes an actuator in the form of a piston/pusher rod which connects to the elongate drawbar both of which are associated with or located inside the headstock of the machine and it is the drawbar of the headstock which is connected to the collet adaptor drawbar. In this prior art machinery, the actuator drives the headstock drawbar which drives the collet adaptor drawbar which drives the collet for both clamping and release of tools or tool blanks. Thus the clamping and release mechanisms of the prior art are substantially external to the collet adaptor. Also, in this prior art machinery, the connections are permanent connections, releasable or disengagable only when components are to be replaced or changed or the machinery maintained.

However, in this prior art, alignment errors occur in each connection between and in the prior art, it will be evident that there are multiple connections. A disadvantage of this is that any inaccuracy in alignment of the actuator or elongate drawbar can have an impact on the alignment accuracy of the collet adaptor drawbar and the collet of the collet adaptor, or of the collet adaptor itself.

Also, while mechanical connections between components can introduce alignment errors, other factors such as thermal expansion can also introduce errors and the length and weight of the actuating assembly can magnify these errors. Accordingly, prior art machines are complex in order to compensate for alignment errors of this kind and this elevates the cost of the machinery.

Various prior art forms of collet adaptors exist. These are sometimes complex in terms of the number of parts the collet adaptor comprises, and the manner of operation. Wear of parts can compromise the operation of the collet adaptor, particularly in relation to high precision machining. Complex arrangements are generally more susceptible to wear than arrangements of less complexity. As indicated above, prior art tool forming machinery to which a collet adaptor is connected for use can also embody complex arrangements for shifting the collet within the collet adaptor, and that can also have an adverse effect on the accuracy of the operation of the collet adaptor. It must be appreciated that some uses of the collet adaptor of the invention operate to accuracy at micron level. Thus, any misalignment of the collet within the collet adaptor, or misalignment of the collet adaptor itself, can have an adverse effect on the production of accurate tools.

As indicated, wear of components of a collet adaptor can affect the precision with which a tool or tool blank is machined. Moreover, the environment in which collet adaptors operate makes wear of components highly likely. For example, many of the tools or tool blanks that are gripped by a collet adaptor for machining are formed from carbide, which is an abrasive material and which, during grinding or milling of the tool or tool blank, can form small particles or dust which can enter between components of the collet adaptor. Over time, the carbide can cause wear between the components and when the wear has become sufficient that the precision required of the collet adaptor is no longer available, the collet adaptor must be repaired or replaced.

In addition to the issue of component wear, collet adaptors preferably are easy to operate in terms of connection of collets and connection and release of tools or tool blanks. Some of the more complex prior art collet adaptors are difficult to use and therefore do not satisfy this requirement. Also, the complexity of these arrangements can affect the accuracy of alignment of a tool or tool blank for machining for reasons already explained.

Accordingly, it is an object to provide a collet adaptor which has one or more of a simplified construction, improved accuracy, is easy to use and is less prone to wear. It is further desirable to provide a collet adaptor the operation of which to an operator does not depart significantly from prior art collet adaptors except where the operation is simplified.

SUMMARY OF THE INVENTION

According to the present invention there is provided a collet adaptor including a body, the body having forward and rear ends and an axial bore extending through the forward and rear ends, a drawbar disposed at least partly within, the bore for connection to a collet, the drawbar being secured within the bore and a biasing arrangement within the bore acting on the drawbar in a direction tending to shift the drawbar rearwardly within the bore, the drawbar being displaceable within the bore against the biasing influence of the biasing arrangement to shift forwardly within the bore.

The present invention also provides a combination of a collet adaptor described above, with a collet which is connected to the drawbar of the collet adaptor.

A collet adaptor according to the invention can be made to have a very simple construction and importantly, the clamping and release mechanisms are part of or within the collet adaptor. Thus, clamping of a tool or tool blank within the collet adaptor occurs without requiring an external clamping mechanism. An actuating load is required to release a tool or tool blank (by engaging the drawbar and shifting it forwardly within the bore), but no accuracy is required for that operation. That is any errors that are introduced in alignment during release can be tolerated. It is only during clamp that errors are required to be minimised and the invention facilitates this by isolating the clamping movement to within the collet adaptor rather than relying on an external mechanism for that purpose. In a collet adaptor according to the invention the collet adaptor remains completely disengaged from the actuator of the tool forming machine during machining of a tool or tool blank as that actuator is only required when the tool or tool blank is to be released from the collet adaptor.

The arrangement of the invention thus can reduce the cost of the machining system because of a reduced need for alignment compensation in the system and can provide for more accurate machining.

Moreover, the construction of the machine with which the collet adaptor is used can also be simplified. This is because in the prior art, the mechanism to engage the drawbar of a collet adaptor and to shift it forward and back is often complex and can include a high parts count, including the elongate drawbar and piston/pusher rod mentioned above. This increases the potential for misalignment. Moreover, as indicated above, most prior art arrangements include a permanent connection or coupling between the actuator, the forming machine drawbar and the collet adaptor drawbar, thus increasing the potential for misalignment of the collet adaptor through misalignment of the connections, whereas in the present invention, the collet adaptor can be completely disengaged from the actuator of the forming machine (including the machine drawbar) once the collet has gripped a tool or tool blank for machining. Thus, in the present invention, the actuator of the forming machine only engages the collet adaptor during required movement of the drawbar to grip or release a tool or tool blank and this is when accuracy of alignment is not critical. Despite this, a collet adaptor according to the invention can operate in substantially the same way as prior art collet adaptors, or can act in a simplified way, that is easy to understand and operate. Accordingly, a collet adaptor according to the invention is not considered to require significant re-training of machine operators who are used to prior art collet adaptors.

In a collet adaptor according to the invention, the drawbar can be displaceable by an actuator from a collet retracted position to a collet extended position against the biasing influence of the biasing arrangement. The biasing arrangement can be such as to shift the drawbar to a collet retracted position upon release of any actuator load tending to push the drawbar away from that position. The collet adaptor according to the invention thus is self clamping and requires no external assistance to clamp as in some prior art arrangements. Accordingly, the collet adaptor according to the invention can be made so that once a load is removed from the drawbar the biasing arrangement will return the drawbar to a retracted position in which the collet adaptor is positioned for gripping a tool or tool blank. The retracted position might vary depending on the size of the collet. Advantageously, this means that an operator of a machine that employs the collet adaptor is not required to manipulate the drawbar to return it to the collet retracted position other than to release the load applied to the drawbar.

The biasing arrangement can be made to act between the drawbar and any other suitable part of the collet adaptor to produce the required biasing influence. In some forms of the invention, the biasing arrangement acts between the drawbar and the body of the collet adaptor. In these forms of the invention, the body and the drawbar can define an annular recess between them within which an annular spring is disposed. The recess can be formed intermediate the forward and rear ends of the body and the recess can be sealed against the ingress of foreign matter to protect the spring against wear and loss of accuracy that might accompany ingress of foreign matter. The recess can be formed between an outside surface of the drawbar and an internal facing surface of the body. The outside surface of the drawbar can be a stepped surface which is stepped relative to an adjacent surface of the drawbar.

The recess can define facing abutment surfaces of which one abutment surface is a face of the drawbar and the other abutment surface is a face of the body. The abutment surfaces can be generally perpendicular to the outside surface of the drawbar and the internal facing surface of the body which define the recess. The annular spring can act against each of the drawbar and the body, such as against the abutment surfaces described above, in a manner to impose a biasing influence against the drawbar tending to shift it rearwardly within the bore. Two or more springs can be used in series as required. The springs can be disc springs or coil springs.

In order to displace the drawbar within the bore against the biasing influence of the biasing arrangement, an end of the drawbar can extend out of the bore of the body at the rear end of the body and the drawbar can be displaceable against the biasing influence by a load applied to the drawbar end. In alternative arrangements, the drawbar end could be flush with an end portion of the body, or inboard of the end portion and still have a load applied to it to displace the drawbar as required.

The load can be applied to the drawbar in any suitable manner. It is expected that in most arrangements, the load will be applied by a pneumatic or hydraulic actuator which is part of the tool forming machinery that the collet adaptor is used with. The actuator could be a ram or a rotatable cam could be employed. The actuator can simply bear against one end of the drawbar and push the drawbar forward to shift the collet to the collet extended position in which the collet is open to accept a tool or tool blank. As indicated above, once the tool or tool blank has been loaded into the collet and the collet has been shifted to the collet retracted position, the actuator can shift out of bearing engagement with the drawbar so that the drawbar and the actuator are decoupled. The actuator thereafter has no ongoing influence on the drawbar and thus cannot affect its accurate alignment within the body of the collet adaptor, nor can it affect the accurate alignment of the collet adaptor itself. This is a significant improvement over the prior art.

The drawbar can be retained from release within the body in any suitable manner. In some forms of the invention, the drawbar cooperates with the body through cooperating abutments formed on the respective drawbar and body which engage when the drawbar is in a home or collet retracted position, so that the drawbar can be retained against removal from the bore of body.

In some forms of the invention, the body is formed of at least two connected parts, which include a body portion and a retainer. The connection can be a sealed connection to seal against the ingress of foreign matter. In these forms of the invention, the retainer can cooperate with the drawbar to secure the drawbar against release from the bore of the body. Like the example given above, each of the retainer and the drawbar can include cooperating abutments that engage when the drawbar is in the home or collet retracted position. The retainer can be positioned at or towards the trailing end of the drawbar (opposite the end to which the collet attaches) and can be attached to the body by threaded engagement. The retainer can be the portion of the body which accommodates an anti-rotation device of the kind discussed above. The retainer can also define a portion of the recess that accommodates the spring bias also as discussed above.

The retainer can take any suitable form, but in some forms can be annular and define a central opening through which the drawbar extends. Thus, the drawbar can extend through the opening and can be displaceable against the biasing influence of the biasing arrangement by a load applied to an exposed end of the drawbar. As discussed earlier herein, the drawbar could alternatively extend to a position flush with an end of the retainer, or could be inboard of the end and in each of these arrangements, a load could still be applied to the drawbar to shift it against the biasing influence of the biasing arrangement.

Where the retainer is annular, the cooperation to secure the drawbar against release from the bore of the body can be by a step in the internal surface of the retainer which is proximate a step formed in the facing outside surface of the drawbar whereby each step forms an abutment face that engage when the drawbar is in the home or collet retracted position.

In most forms of the invention it is expected that the connection of a collet to the drawbar will be made at a forward end of the drawbar. In these forms of the invention, the drawbar can be threaded at a forward end for threaded connection with a collet. Alternative connectors include a bayonet style connection, or a snap-fit connection.

It is intended in most forms of the invention that a collet is insertable into the bore of the collet adaptor from the forward end of the body and connectable to the drawbar via that insertion. However, in some forms of the invention, the drawbar can be moved sufficiently within the bore for the forward end of the drawbar to extend flush with the forward end of the body or to extend out of the bore beyond the forward end if required for connection to a collet.

It is further intended in most forms of the invention that the amount of forward displacement of the drawbar against the biasing influence of the biasing arrangement, is limited to an amount that enables the collet to be connected to the drawbar and to be disconnected therefrom. The movement is necessary for the sides of the collet to disengage from the tapered surface of the forward end of the body so as to be releasable, usually by rotation to threadably disengage from the drawbar. The extent of movement might thus be in the order of 1 or 2 mm. This small amount of movement tends to enhance the accuracy of the collet adaptor of the invention by not requiring larger movement for gripping and releasing a tool or tool blank.

Forward displacement of the drawbar can be limited if required and in some forms of the invention, that limitation can be by engagement of the drawbar with another component of the collet adaptor, such as an abutment formed in the body. Alternatively, where the biasing arrangement comprises an annular spring, the amount of forward displacement of the drawbar can be limited by the maximum compression of the spring.

In some forms of the invention, an anti-rotation device can be applied to one or both of the drawbar and a collet which is connected to the drawbar, to prevent or resist rotation of the drawbar or collet within the body. The anti-rotation device(s) can take any suitable form, but in some forms, it comprises one or more screws which are screwed through the body and into position relative to the drawbar and/or the collet to prevent rotation of the drawbar and/or the collet. The screws can screw into an aperture or slot and/or collet for example. For example, one or more the screws could screw through an opening in the body from outside the body and into a slot formed in the outside wall of the drawbar and/or the collet. Use of a slot which extends lengthwise of the drawbar and/or the collet allows the drawbar and the collet to move lengthwise within the body for the purpose of moving the collet for clamping or releasing a tool or tool blank from the collet, but without allowing the drawbar or the collet to rotate relative to the body. As indicated above, the required extent of movement of the drawbar and the collet to clamp or release a tool or tool blank from the collet can be in the order of 1 or 2 mm, so the minimum length of the slot is not required to be much greater than this. Alternative anti-rotation devices can include a key or a pin which is inserted into a suitable opening, such as an opening in the body and into a slot in the drawbar and or the collet.

Anti-rotation devices can be positioned lengthwise of the collet adaptor so that for example, first and second anti-rotation devices can respectively engage the drawbar and/or the collet at or towards opposite ends of the drawbar or the drawbar/collet assembly. The preference is for a first anti-rotation device to engage the drawbar and for a second anti-rotation device to engage the collet, and in arrangements of this kind, at least the second anti-rotation device is installed after the collet has been attached to the drawbar.

Where an anti-rotation device is applied to engage the drawbar, that device can be positioned to engage towards the rear end of the drawbar and to engage within a slot at the rear end. The slot can be open at the end of the drawbar and extend to an abutment inboard of the end, so that the anti-rotation device can be in place in the body when the drawbar is inserted into the body and the drawbar can be rotated to align the slot with the anti-rotation device and then shifted lengthwise of the body to engage the anti-rotation device within the slot.

More than a single anti-rotation device can be positioned at the same lengthwise position of the drawbar, so that for example, two or three screws, keys or pins could be inserted at 180° or 120° to each other about the drawbar at the same lengthwise position of the drawbar. For each anti-rotation device, a suitable engagement must be provided on the drawbar or the collet such and in some forms of the invention, for each anti-rotation device, a slot is provided to receive the device.

Where the biasing arrangement is formed as a disc spring(s), in testing to date, a spring constant per spring of 3729 N/mm has been employed. Where two disc springs are employed in parallel, the constant has been selected to be 7458 N/mm.

In a collet adaptor according to the invention, the drawbar is intended to have movement only for clamping and releasing a tool or tool blank from a collet.

BRIEF DESCRIPTION OF THE DRAWINGS

In order that the invention may be more fully understood, some embodiments will now be described with reference to the drawings in which:

FIG. 3 is a cross-sectional side view of the collet adaptor of FIGS. 1 and 2 in a clamped position.

DETAILED DESCRIPTION OF THE DRAWING

Figure 1:
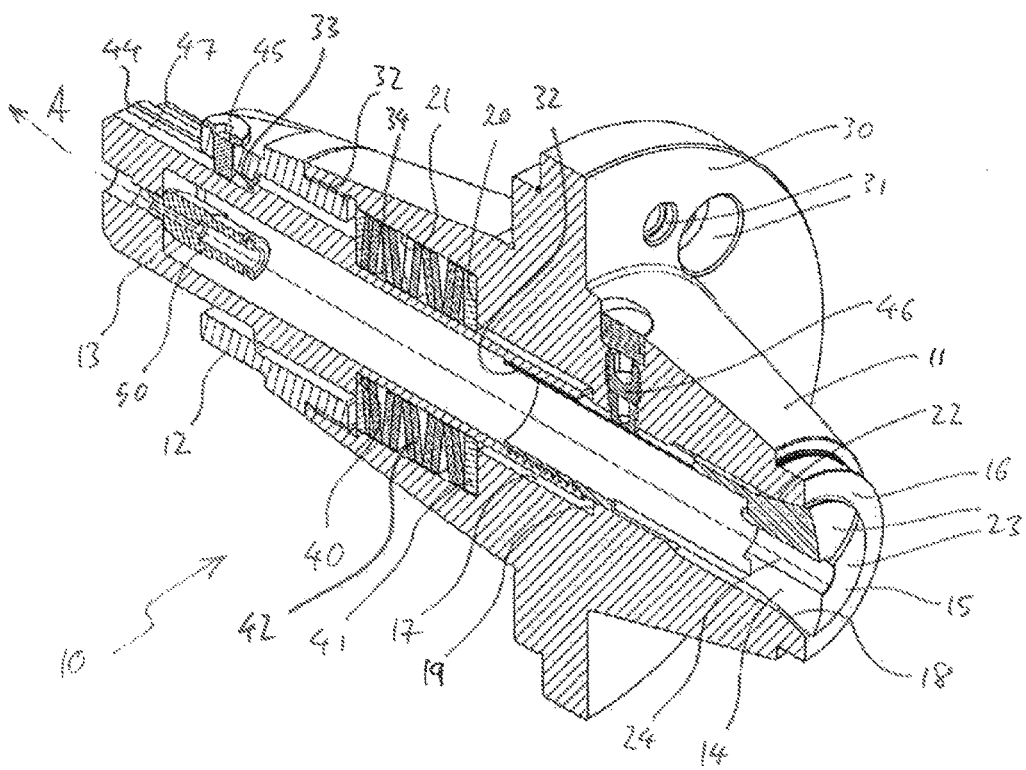
FIG. 1 is a cross sectional perspective view taken through the centre line of a collet adaptor in a clamped condition according to the invention.

FIGS. 1 and 3 illustrate a collet adaptor 10 which includes a body formed of a body portion 11 and a spring retainer 12, a drawbar 13 and a collet 14. The collet 14 is shown in a collet retracted position in which a tool will be clamped in the collet (the tool is not shown in FIGS. 1 and 3). In FIGS. 1 and 3, the collet end 15 is approximately flush but slightly proud of the end 16 of the body portion 11.

The body portion 11 defines a central bore 17 which is of non-uniform diameter, and which defines a tapered bore end surface 18, an abutment 19, a shoulder 20 and a major diameter 21. The tapered bore end surface 18 is tapered at an angle which is complementary to a facing tapered surface 22 of the collet 14. The arrangement is such that as the collet 14 is drawn inwardly into the bore 17, the respective tapered surfaces 18 and 22 engage and the collet gripping sections 23 (only 2 of which are illustrated in FIG. 1) contract radially so that the collet bore 24 reduces in diameter to a clamped condition and a tool or tool blank that is captured within the bore 24 is gripped by the collet 14. This arrangement of gripping by the collet 14 is standard and is embodied in prior art collet arrangements. This arrangement also facilitates the use of the collet adaptor 10 with different sizes of collets, whereby for each collet, the connection (as later described herein) with the drawbar is the same, but the bore diameter 24 will differ.

Figure 2:
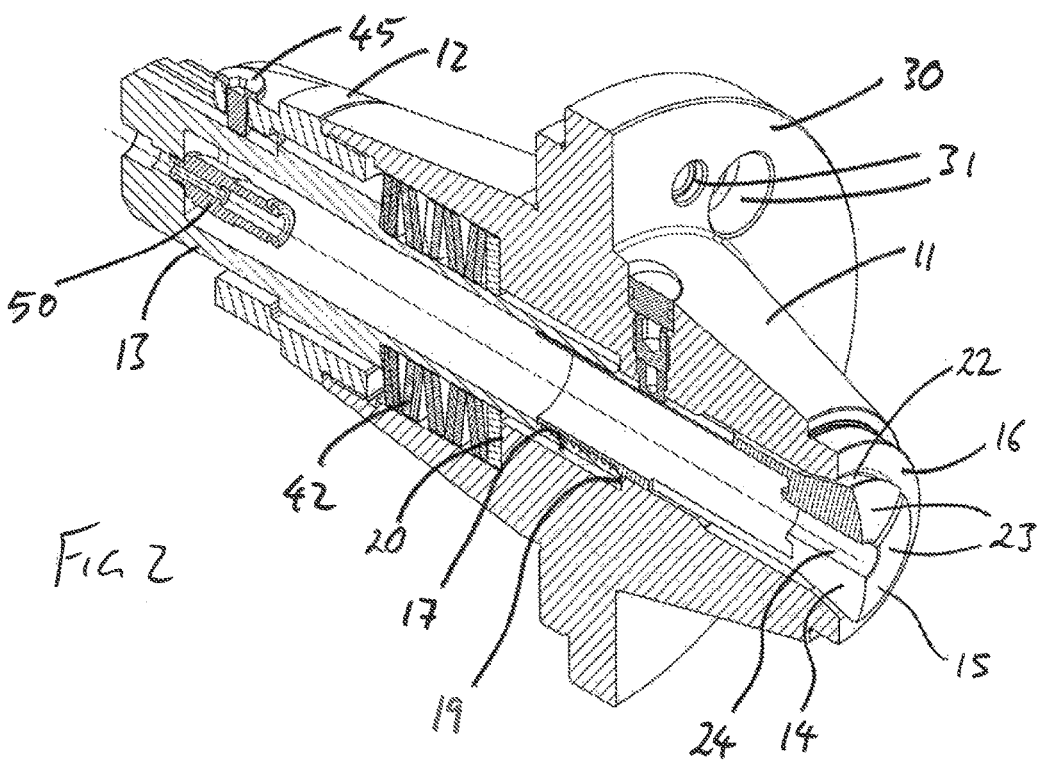
FIG. 2 is a cross sectional perspective view taken through the centre line of a collet adaptor in an unclamped condition according to the invention.

FIG. 2 illustrates the collet adaptor 10 in an unclamped condition prior to the collet 14 being drawn inwardly into the bore 17. In this figure, the collet end 15 is further away from the end 16 of the body portion 11 than in FIG. 1 and the gripping sections 23 are spaced further apart to increase the size of the bore 24. The difference in position of the end 15 relative to the end 16 can be a matter of 1 or 2 mm. In the FIG. 2 position, a tool or tool blank can be loaded into the bore 24 of the collet 14 and then the collet can be retracted into the bore 17 so that the gripping sections 23 radially contract to reduce the diameter of the bore 24 so as to grip and hold the tool or tool blank. The extent of retraction of the collet 14 is small and usually in the order of about 1 or 2 mm.

The body portion 11 of the collet adaptor 10 includes a radial flange 30 that is configured for fitting to a CNC machine or other like machine, and openings 31 are provided for receiving securing bolts, pins or the like. The manner in which the collet adaptor 10 is fitted to a suitable tool forming machine is also part of the prior art and is not of significant importance to the present invention.

The retainer 12 and the body portion 11 are connected at a rear end of the collet adaptor 10 by a threaded connection 32. The connection between the retainer 12 and the body portion 11 can be a sealed connection to prevent the ingress of foreign matter into the body 11. Prior to connection of the retainer 12 to the body portion 11, the drawbar 13 can be inserted into the body portion 11 after that the retainer 12 is threadably connected to the body portion 11. An anti-rotation device incorporating a screw 45 can then be inserted as will be discussed later herein. Alternatively, the drawbar 13 can be inserted into the retainer 12 and the retainer and drawbar can be fitted to the body portion 11. The anti-rotation device can be installed when the drawbar 13 is inserted into the retainer 12 or after the retainer and drawbar have been fitted to the body portion 11. Once the drawbar has been connected to the collet 14, withdrawal of the drawbar 13 from the bore 17 is prevented by the collet end 15 engaging the tapered bore end surface 18 and by the anti-rotation screw 45 engaging against an abutment 33 of the drawbar 13.

Disposed between an abutment 40 of the drawbar 13 and the shoulder 20 of the body portion 11, is a washer 41 and a disc spring assembly 42 formed from a plurality of disc springs. The washer 41 and the spring assembly 42 are located within an annular recess formed at each end by the abutment 40 and the shoulder 20, and by the surface of the major diameter 21 and the facing surface 34 of the drawbar 13. The spring assembly 42 effectively acts between the drawbar 13 and the body portion 11.

The spring assembly 42 applies a biasing influence tending to push the drawbar 13 rearwardly or in the direction A. A load which is applied to the drawbar 13 opposite to the direction A can shift the drawbar 13 forwardly within the collet adaptor 10 and against the biasing influence of the spring assembly 42. In FIGS. 1 and 3, the drawbar 13 is shown in a collet retracted position, in which the forward collet end 15 is substantially flush with the end 16 of the body portion 11. That is the position of the collet 14 is in an operational position in which a tool or tool blank can be captured within the collet bore 24. The drawbar 13 can be shifted to the collet extended position of FIG. 2 by movement of the drawbar 13 against the biasing influence of the spring assembly 42 opposite to the direction A. In the embodiments illustrated in FIGS. 1 and 2, the shifting movement is approximately 1 to 2 mm.

By shifting the drawbar 13 opposite to the direction A, the collet 14 can also be shifted in the same direction. This is because the drawbar 13 and the collet 14 are connected together by a threaded connection 32 at the respective forward end of the drawbar 13 and the rear end of the collet 14. By shifting the collet 14 forwardly, the tapered surface 22 is shifted relatively to the tapered bore end surface 18 and that allows the collet sections 23 to splay radially outwardly and to release the gripping load on a tool or tool blank. The tool or tool blank can thus be removed from the collet 14 and a new tool or tool blank inserted to take its place. Throughout this time, pressure can be applied to the rear end 44 of the drawbar 13 to maintain the drawbar 13 and the collet 14 in a forward or collet extended position and once the existing tool or tool blank has been removed and a new tool or tool blank has been inserted, the load applied to the rear end 44 can be released and the spring assembly 42 will drive the drawbar 13 back in the direction A to the collet retracted position. The pressure which is applied to the rear end 44 of the drawbar 13 to shift the drawbar and collet to the collet extended position can be by way of a pneumatic or hydraulic actuator formed as part of the machinery with which the collet adaptor 10 is used. Once the load applied to the rear end 44 has been released and the spring assembly 42 has driven the drawbar 13 back to the collet retracted position, the actuator can completely disengage from the rear end 44.

Because only forward pressure is required from the actuator to move the drawbar 13 and the collet 14 to the collet extended position and to maintain them at that position, the actuator can simply bear against the rear end 44 and is not required to be positively coupled thereto.

The movement described above is simple and effective and minimizes the number of components involved.

The collet adaptor 10 further includes anti rotation screws 45 and 46. The screw 45 screws through the retainer 12 into a slot 47 formed in the rear or trailing end of the drawbar 13, while the screw 46 screws through the body portion 11 and into a similar slot formed in the collet 14. Thus, the drawbar 13 and the collet 14 are maintained against rotation relative to each other.

The collet adaptor 10 further includes a reverse check valve 50 that allows air to be blown into the drawbar 13, but which does not allow flow of cutting oil out of the drawbar 13 and into the machinery with which the collet adaptor 10 is being used.

It will be evident from FIG. 1, that the collet adaptor 10 includes a minimum number of features. Moreover, the moveable parts of the collet adaptor 10 are robust and therefore the life of the adaptor is expected to exceed current adaptors that are more complex in design.

The collet adaptor 10 is also simple to use, in that to release a tool or tool blank from the collet 14, all that is necessary is to apply a load opposite to the direction A to the drawbar 13, and once the tool or tool blank is removed and another tool or tool blank is inserted, the load applied to the drawbar can simply be released and the spring 42 will return the drawbar 13 to the collect retracted position.

Release of the load applied to the drawbar can be by way of complete disengagement between an actuator that engages the rear end 44 of the drawbar 13 to shift it forward, so that the actuator has no ongoing attachment to the drawbar once a tool or tool blank has been clamped in the collet 14. The actuator thus advantageously cannot affect the alignment of the drawbar during machining of a tool or tool blank. This is in contrast to many prior art arrangements and can contribute to an increase in machining accuracy provided by the present invention.

Moreover, the mechanism to replace a collet is simple by engaging the rear end 44 of the drawbar 13 to shift it forward, such as by the actuator of the machinery with which the collet adaptor 10 is to be used, thereby advancing the collet 14 to the collet extended position and unthreading the collet 14 from the drawbar 13. While the drawbar 13 remains in the collet extended position, a new collet can be fitted to the drawbar.

The invention therefore is simple, robust, and easy to use. This will potentially allow the invention to have a greater working life than prior art collet adaptors, or at least a greater maintenance free life. The invention further is expected to improve machining accuracy by the simple construction and because the drawbar can be free from attachment to an actuator during machining.

The claims defining the invention are as follows:

1. A collet adaptor including a body, the body having forward and rear ends and an axial bore extending through the forward and rear ends, a drawbar disposed within the bore for connection to a collet, the bore being constructed so that the drawbar is insertable into the bore from the rear end of the bore and is retained within the bore after insertion by an annular retainer that secures the drawbar against release from the bore, the annular retainer and the body being connected by a threaded connection which extends coaxially with the axial bore, a forward end of the drawbar being for connection of a collet and the bore being constructed so that the collet can be inserted into the bore from the front end of the bore for connection with the forward end of the drawbar, a biasing arrangement within the bore acting on the drawbar in a direction tending to shift the drawbar rearwardly within the bore, an end of the drawbar extending out of the bore at the rear end of the body and the drawbar being displaceable within the bore against the biasing influence of the biasing arrangement by load applied to the drawbar end to shift forwardly within the bore.

2. A collet adaptor according to claim 1, the drawbar being displaceable from a collet retracted position to a collet extended position against the biasing influence of the biasing arrangement.

3. A collet adaptor according to claim 1, the biasing arrangement acting between the drawbar and the body.

4. A collet adaptor according to claim 1, the biasing arrangement comprising an annular spring.

5. A collet adaptor according to claim 4, the body and the drawbar defining an annular recess within which the annular spring is disposed.

6. A collet adaptor according to claim 5, the biasing arrangement comprising an annular bevel spring.

7. A collet adaptor according to claim 1, the biasing arrangement a plurality of annular disc springs.

8. A collet adaptor according to claim 1, the body being formed in at least two connected parts including a body portion and a spring retainer.

9. A collet adaptor according to claim 8, the annular retainer being annular and being annular and defining a central opening and the drawbar extending through the opening so that an end of the drawbar extends out of the annular retainer and the drawbar being displaceable against the biasing influence of the biasing arrangement by load applied to the end.

10. A collet adaptor according to claim 1, the connection of a collet to the drawbar being to a forward end of the drawbar.

11. A collet adaptor according to claim 10, the drawbar being threaded at a forward end for threaded connection with a collet.

12. A collet adaptor according to claim 1, the amount of forward displacement of the drawbar being limited by engagement between the body and the drawbar.

13. A collet adaptor according to claim 12, the biasing arrangement comprising an annular spring and the amount of forward displacement of the drawbar being limited by maximum compression of the spring.

14. A collet adaptor according to claim 1, including an anti-rotation device engaging the drawbar to prevent rotation of the drawbar within the bore.

15. A collet adaptor according to claim 14, the anti-rotation device being releasably engageable with the drawbar.

16. A collet adaptor according to claim 1, a rotation arrester being positioned for engaging a collet that has been connected to the drawbar to prevent rotation of the collet within the bore.

17. A combination of a collet adaptor according to claim 1 and a collet connected to the drawbar of the collet adaptor.

18. A collet adaptor according to claim 1, wherein the collet adaptor is adapted to permit installation and removal of the collet from the collet adaptor without removing any part of the collet adaptor.

19. A collet adaptor according to claim 1, wherein the annular retainer is coupled to the body at the rear end of the body.

\* \* \* \* \*